US006805006B2

(12) United States Patent
Guzman (10) Patent No.: US 6,805,006 B2
(45) Date of Patent: Oct. 19, 2004

(54) METHOD AND APPARATUS FOR MEASURING THE MAXIMUM SPEED OF A RUNNER OVER A PRESCRIBED DISTANCE INCLUDING A TRANSMITTER AND RECEIVER

(75) Inventor: Rudy Guzman, Coral Springs, FL (US)

(73) Assignee: BBC International, Ltd., Boca Raton, FL (US)

( * ) Notice: Subject to any disclaimer, the term of this patent is extended or adjusted under 35 U.S.C. 154(b) by 0 days.

(21) Appl. No.: 10/234,732

(22) Filed: Sep. 3, 2002

(65) Prior Publication Data

US 2003/0005766 A1 Jan. 9, 2003

Related U.S. Application Data

(63) Continuation-in-part of application No. 09/954,869, filed on Sep. 17, 2001, now Pat. No. 6,604,419, which is a continuation-in-part of application No. 09/732,321, filed on Dec. 7, 2000, now Pat. No. 6,738,726.

(51) Int. Cl.[7] .......................... G01P 15/00; G01C 22/00
(52) U.S. Cl. ............................ 73/490; 73/491; 702/160
(58) Field of Search .......................... 73/488, 489, 490, 73/491, 493, 503; 702/141, 142, 149, 160; 482/3, 8; 235/105; 377/24.2

(56) References Cited

U.S. PATENT DOCUMENTS

| | | | | |
|---|---|---|---|---|
| 4,334,190 A | * | 6/1982 | Sochaczevski | 324/171 |
| 4,466,204 A | | 8/1984 | Wu | 36/132 |
| 4,510,704 A | | 4/1985 | Johnson | 36/136 |
| 4,712,319 A | | 12/1987 | Goria | 36/137 |
| 5,476,427 A | | 12/1995 | Fujima | 482/3 |
| 5,724,265 A | * | 3/1998 | Hutchings | 702/141 |
| 5,807,283 A | | 9/1998 | Ng | 600/595 |
| 5,899,963 A | * | 5/1999 | Hutchings | 702/145 |
| 5,945,911 A | | 8/1999 | Healy et al. | 340/573.1 |
| 6,013,008 A | | 1/2000 | Fukushima | 482/8 |
| 6,021,351 A | | 2/2000 | Kadhiresan et al. | 607/19 |
| 6,122,960 A | * | 9/2000 | Hutchings et al. | 73/493 |
| 6,243,659 B1 | * | 6/2001 | Dominici et al. | 702/160 |
| 6,305,221 B1 | * | 10/2001 | Hutchings | 73/488 |
| 6,356,856 B1 | * | 3/2002 | Damen et al. | 702/160 |

* cited by examiner

Primary Examiner—Helen Kwok
(74) Attorney, Agent, or Firm—Holland & Knight LLP (57) ABSTRACT

A method and apparatus is provided which comprises a console including on/off push buttons and a liquid crystal display for providing messages to the user, a receiver unit, a transmitter unit and a circuit capable of calculating the speeds of the user during use as well as operate LEDs which display the status of the apparatus and flash in response to movement of the user wearing the device while he or she is running or walking.

14 Claims, 10 Drawing Sheets

FROM FIG. 2A

METHOD AND APPARATUS FOR MEASURING THE MAXIMUM SPEED OF A RUNNER OVER A PRESCRIBED DISTANCE INCLUDING A TRANSMITTER AND RECEIVER

RELATED APPLICATIONS

This is a continuation-in-part application of U.S. patent application Ser. No. 09/954,869, filed Sep. 17, 2001 now U.S. Pat. No. 6,604,419 and entitled "Apparatus and Method for Measuring the Maximum Speed of a Runner Over a Prescribed Distance," which is a continuation-in-part of U.S. patent application Ser. No. 09/732,321 filed Dec. 7, 2000 now U.S. Pat. No. 6,738,726 having the same title.

FIELD OF THE INVENTION

This invention relates to generally to pedometers, and more particularly, to a method and apparatus for measuring the maximum speed of a runner over a prescribed distance which employs an RF transmitter and receiver.

BACKGROUND OF THE INVENTION

Today, it is not uncommon for shoes to include entertaining and functional electronics. The electronics usually include a simple timing circuit and/or a movement-sensitive switch, a battery, and an array of LED-type lights. The electronic circuit of the type typically found in popular shoes today is used to illuminate the LEDs either at regular (or predetermined) intervals, or whenever the shoes are moved a predetermined degree, such as when the wearer walks, jumps, or runs. It appears that the primary purpose of the lighting circuit located in today's shoes is to entertain both the wearer of the shoes, and those in the vicinity. It also appears that the timing circuit and/or the movement-sensitive switch are experiencing increased use in determining the number of steps taken by a wearer of the shoe while walking, jumping or running.

Along with life style changes to increase personal health, the importance of walking is being emphasized to a greater extent. Many people wear a pedometer during routine daily exercise. While wearing the pedometer, a person can learn how many steps they took on a given day or during a specific time interval. With this information, the user can set their own target step count. By achieving this step count on a daily or regular basis, the user can maintain their physical health by walking and/or exercising in accordance with the target step count.

U.S. Pat. No. 6,021,351 to Kadhiresan et al. discloses an apparatus and method for assessing the effectiveness of changes in therapy upon a patient's well-being. According to this reference, the method involves the steps of affixing to the patient one or more sensors for sensing a parameter related to the patient's level of activity and for providing an electrical output signal corresponding to the activity level. The sensor produces a raw accelerometer output signal which is proportional to body movement of the patient. The output signal is sampled and filtered to insure that noise due to heart sounds and respiration are effectively removed from the accelerometer output signal. The absolute value of the accelerometer signal is then obtained and rectified and provided to an averager circuit to eliminate any high frequency noise signals which can contaminate the results. The output signal from the averager is then compared to a threshold level, and applied to a microprocessor which is programmed to execute an algorithm for assessing patient well-being and for optimizing patient well-being.

According to U.S. Pat. No. 6,013,008 to Fukushima, a step count data control system is used to encourage a user to continue walking along a prescribed distance. Step count data is obtained while the user is walking and the progress and location of the user is objectively displayed on a map, based on the actual distance walked and the number of steps taken. A microprocessor is used to determine the average distance traveled over a specific time period, such as one month. The map is a chart, such as the map of Japan, which shows the present position being walked along from an assumed starting point. The distance from the start point to the present point is indicated on the map by color, or another suitable indicator.

A shoe having an indicator responsive to the activity of the person wearing the shoe is disclosed in U.S. Pat. No. 5,945,911 to Healy et al. A circuit board is embedded in the typical athletic shoe so that it becomes a shoe with a built-in activity meter. According to this patent, the circuit board is preferably mounted inside the heel portion of the sole of the shoe and, more preferably, inside the heel portion of the mid sole. With this configuration, the heel of a wearer's foot will activate a switch located on the circuit board when the wearer is stepping, walking, jumping or running. Using LEDs, the highest level of activity reached by a wearer of the shoe is displayed. The display is a three-element LED display in which 0–3 LEDs flash briefly, but brightly each time the weight of the wearer is fully pressed against the inner sole of the shoe during a period of activity.

U.S. Pat. No. 5,807,283 to Ng discloses an electronic device for monitoring the activity of a wearer, his walking speed, as well as the distance traversed in a selected time interval. The claimed device uses magnets strapped to a leg or a shoe of a person and a hall effect sensor to calculate the distance traversed based on the output signal generated when the magnets pass each other.

U.S. Pat. No. 5,476,427 to Fujima discloses a pace display device which is worn by a person running or jogging. The device calculates and displays the person's pace data which was obtained while the person was running or jogging. According to this patent, by calculating and then displaying the pace difference between the present and immediately proceeding sections of a running course, the runner is able to confirm how fast or how slow his present pace is when compared to his immediately proceeding pace.

U.S. Pat. No. 4,510,704 to Johnson describes a boot or shoe which incorporates a pedometer into the heel of the shoe. The pedometer comprises a push button which is activated with each step. A counter responds to activation of the push button. According to this patent, the counter may be an electronic counter which displays the number of steps the wearer of the shoe takes while walking/running.

U.S. Pat. No. 4,466,204 to Wu describes a device for determining the number of steps and the distance walked by a person. According to the Wu patent a switch is disposed in a toe area of a shoe. This switch generates a pace signal in response to each step which is taken with the shoe.

U.S. Pat. No. 4,712,319 to Searcy discloses a portable self-contained computational device for use by a striding athlete, such as a jogger, which includes a stride length selector that permits the athlete to select a normal length of stride, and a rate selector which permits the athlete to preselect a desired rate of travel by striding.

Although much has been done in this field to introduce distance measurements and pace monitoring to footwear, none of these prior art devices is designed to measure the maximum speed achieved by a runner over a prescribed distance in order to motivate the wearer of the device to run as fast as possible. It is difficult to continue walking or running for a long period of time. Further, without knowing how fast he or she has run, a runner will have no way of knowing whether they are making progress toward maximizing their speed during an exercise session. Moreover, a runner can grow tired of walking or running without any external encouragement. Accordingly, there is a need and desire for a device with which to motivate a person to walk or run at maximum speeds to obtain the benefits associated with exercising.

SUMMARY OF THE INVENTION

It is therefore among the objectives of this invention to provide a method and apparatus for use as a pedometer which is capable of displaying the time, which employs a receiver unit and a transmitter unit, which displays the last recorded speed achieved, which measures the maximum speed of a runner over a prescribed distance, which records the average miles per hour achieved and which may be worn as a watch or other item easily affixed to the body.

These objectives are accomplished in a method and apparatus according to this invention which comprises a console including on/off push buttons and a liquid crystal display ("LCD") for providing messages to the user, a receiver unit, a transmitter unit and a circuit capable of calculating the speeds of the user during use as well as operate LEDs which display the status of the apparatus and flash in response to movement of the user wearing the device while he or she is running or walking.

Initially, the device is in a "standby" low power state. When a first button is momentarily pushed, such as for two seconds, a micro-controller located inside the device is placed in an "active on" state. As a result, the micro-controller provides power to a motion sensor and a motion sensor amplifier. After a predetermined time delay, the LCD and LEDs each turn on to signify that the micro-controller is powered on and ready for use.

In response to each step taken by the user, a motion detector contained within the transmitter unit is operative to generate an RF signal which is then received by the receiver unit. A trigger signal is produced by the receiver unit which is amplified by transistors located in the circuit, and forwarded to a micro-controller within the apparatus for use in the calculation of the maximum speed of the user in accordance with a predetermined relationship. With each generation of a trigger signal, the LEDs flash in a selected sequence. The motion detector may be a spring switch, a buzzer sensor, a metal ball sensor or the like, and is most preferably a buzzer sensor.

The apparatus of this invention provides a method for measuring the maximum speed of a runner over a prescribed distance, and is also capable of generating other indicia in the form of messages on the LCD including the last recorded speed of the runner, his or her highest speed during a use and the average miles per hour. In the presently preferred embodiment, the apparatus may be worn on the wrist as a watch but can be adapted for use on shoes or other parts of the body. The flashing LEDs adds a safety factor to use of the apparatus, particularly when worn at night, and the various displays provided to the user can act as an incentive during a run to maximize performance.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
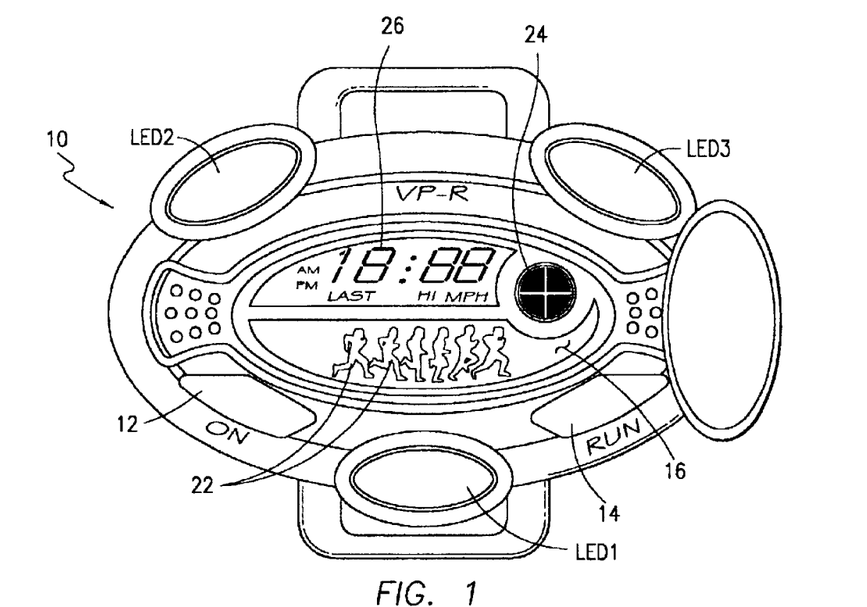
FIG. 1 is an illustration of the control panel of the apparatus of this invention.

FIG. 1 is an illustration of a control panel 10 for the apparatus in accordance with a preferred embodiment of the invention. The console 10 comprises push buttons 12 and 14 for activating and deactivating the device, respectively. Also included are LED1, LED2 and LED3, which are used to display the status of the device and to flash in response to movement of a user wearing the device while running or walking. The console 10 also includes a liquid crystal display (LCD) 16 which displays various messages to the user, such as the last recorded speed achieved, the highest speed achieved and the average miles per hour achieved, respectively.

Figure 2A:
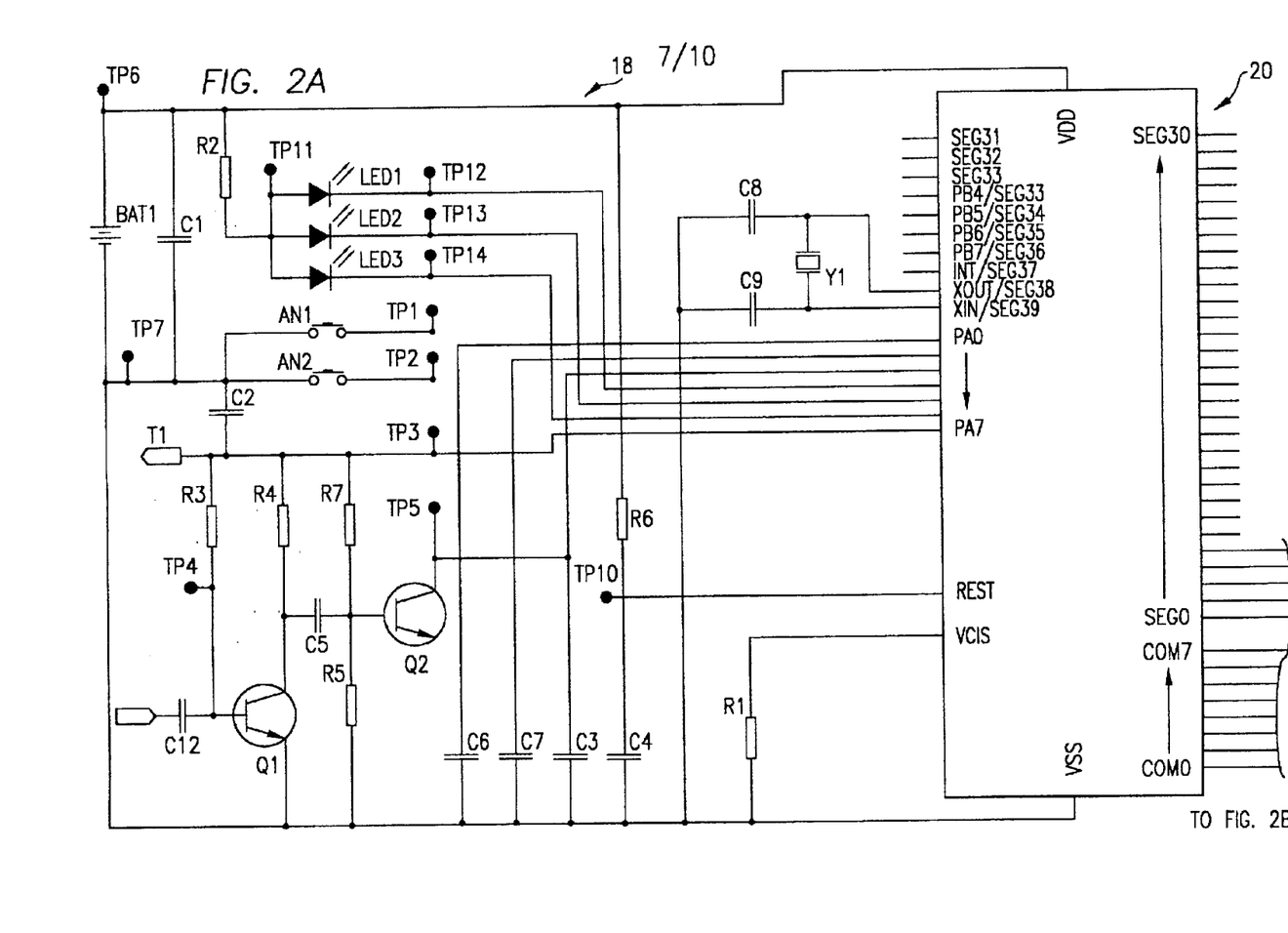
FIG. 2A is a schematic illustration of a portion of the circuit for calculating, presenting, recalling and recording the speed of a user over a prescribed distance in accordance with this invention.
Figure 2B:
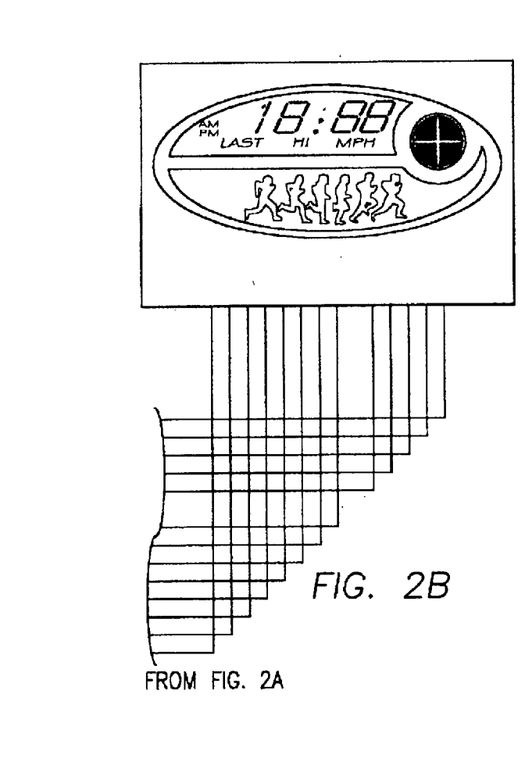
FIG. 2B is the remaining portion of the circuit shown in FIG. 2A.

FIG. 2 is an illustration of an exemplary circuit 18 for calculating, presenting, recalling and recording a speed of a user over a prescribed distance. The principal element of the circuit is a micro-controller 20, which is capable of making calculations based on various inputs according to a stored program and is further capable of storing the results. The program and locations of the stored results are in memory units or registers of the micro-controller 20. Alternatively, the program and results can be stored in external memory units (not shown).

Initially, the micro-controller 20 is in a "standby" state, where the voltage at output pins PA0 through PA5 is logic "HIGH" and the voltage at output pins PA6, COM0 through COM7 and SEG0 through SEQ3 is logic "LOW." When switch AN1 is momentarily closed (as a result of button 12 being pushed), such as for three seconds, a signal is placed on terminal PA0 of the micro-controller 20, which moves it into an "active" state from a power saving "standby" state. As a result, power is provided from output terminal PA6 of the micro-controller 20 to a switch circuit comprising transistors Q1 and Q2. After a predetermined time delay, micro-controller 20 causes each of LCD 16 as well as LED1, LED2 and LED3 to turn on to signify that the micro-controller 20 is in the active state and is ready for use. In the preferred embodiment, the predetermined time delay is approximately one second.

Similarly, the micro-controller 20 can be changed from the standby state to the active state by closing switch AN2. Closing this switch causes a signal to be applied to terminal PA1 of the micro-controller 20. This also has the effect of causing the micro-controller 20 to apply power to the switch amplifier circuit made up of transistors Q1 and Q2 by changing the voltage at output terminal PA6 from logic "LOW" to logic "HIGH." However, using switch AN2 instead of AN1 causes the microprocessor to be in a different operational mode.

As shown in FIG. 1, the LCD 16 has a display comprised of six Figures. 22, a moving quarter circle 24, and three digits 26 each of which have seven segments for conveying the speed information. Further, the LCD displays words which indicate the type of speed information being indicated by the digits, e.g., the last recorded speed achieved, the highest speed achieved and the average speed, all in miles per hour, respectively.

Resistor R1 is connected between the OSCI and VSS terminals of the micro-controller 20 to establish the frequency rate for an internal oscillator that sets the timing in the microprocessor. One terminal of LED1, LED2 and LED3 is connected to respective outputs PA3, PA4 and PA5 of the micro-controller 20. The other terminal of each of these LEDs is connected together and to a resistor R2 which limits current flow through these LEDs when power is applied to them from the PA outputs of micro-controller 20. A capacitor C1 located across a battery BAT1 provides power to the entire circuit, with the capacitor reducing noise spikes in the power supply line. Capacitor C4 and resistor R6 are used to reset micro-controller 20 when the power from BAT 1 is applied.

The LEDs are lit by the micro-controller 20 in various sequences at a rate determined by the internal oscillator. The pattern in which the LEDs light depend on the state of the micro-controller, e.g., whether a new high speed has been calculated.

Transistors Q1 and Q2 form an amplifier circuit that has power supplied to transistor Q1 from PA6 through R4. The sensitivity of the amplifier circuit is generally adjusted by resistor R4, since this resistor determines the amplification ratio of transistor Q1. For example, if R4 is small, then the sensitivity of the amplifier circuit will become greater. A bias voltage to the input of transistor provided from output PA6 of micro-controller 20 through resistor R3. Similarly, a bias voltage is applied to the input of transistor Q2 from PA6 through resistors R5 and R7. The amplifier output from the collector of Q2 is applied to input terminal PA2 of micro-controller 20. A capacitor C3 filters this output. In response to each step taken by the user, a trigger signal is generated by operation of the transmitter circuit 30 and receiver circuit 40, in a manner described below in connection with a discussion of FIGS. 3 and 4. The trigger signal charges the capacitor C12 which then discharges to increase the voltage at the base terminal of transistor Q1. As a result, transistor Q1 conducts and amplifies the signal and transmits the amplified signal to capacitor C5. Simultaneously, the voltage at the base terminal of transistor Q2 is increased such that transistor Q2 conducts. This causes the output at pin PA2 to immediately change from logic "HIGH" to logic "LOW." A capacitor CO filters external noise from the trigger signal which is amplified by Q1 and Q2 and delivered to PA2 of micro-controller 20, where it is used to calculate the speed of the user.

With each generation of the trigger signal, the LEDs flash in a predetermined sequence. In the preferred embodiment, the predetermined sequence comprises first lighting LED1, followed by the lighting of LED2 and finally the lighting of LED3. The timing of the sequence is under the control of the internal oscillator of the micro-controller 20, whose frequency is controlled by the value of R1. The micro-controller 20 calculates the various speed values based on the elapsed time, as determined by the internal oscillator, between trigger signals and the average stride of the user. The calculations of the various speed values are then stored, and converted into signals for driving the LCD 16 to display the speed value and identify the type of speed information that is being displayed. The outputs COM0 to COM7, as well as SEG0 to SEG3 of micro-controller 20, drive the seven elements of each digit of the three digit LCD display 16, cause the text description of the calculation to be displayed, and cause the figures and the moving circle to light sequentially, respectively.

Figure 3:
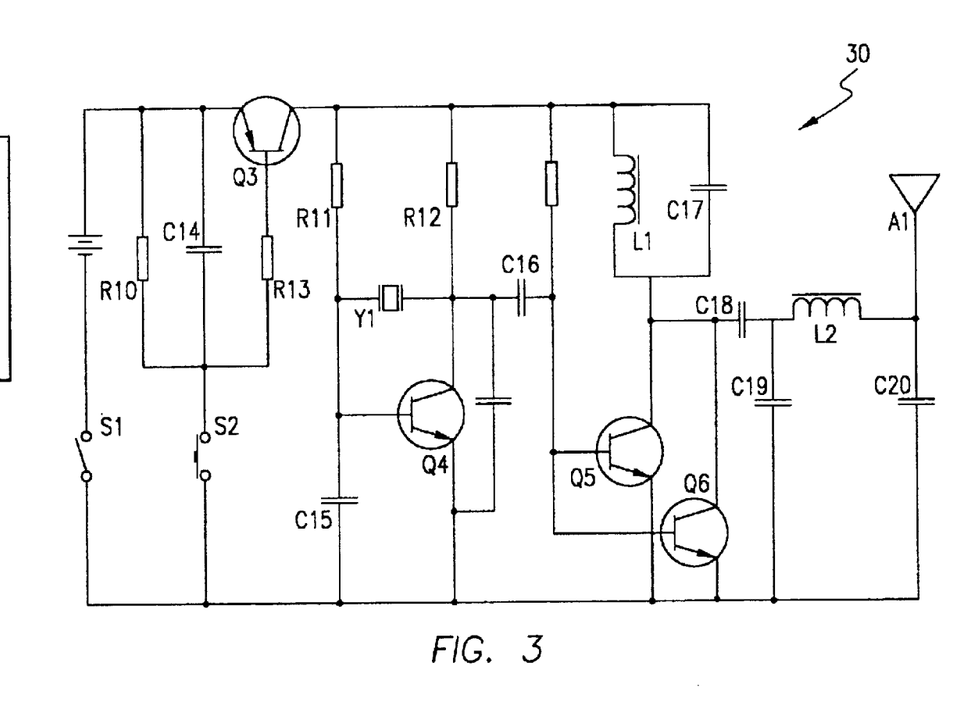
FIG. 3 is a schematic diagram of the circuit for the transmitter unit.

Referring now to FIG. 3, a schematic view of the transmitter circuit 30 of this invention is shown. The purpose of the transmitter circuit 30 is to generate an RF signal representative of each stride taken by the user, and to transmit such signal to the receiver circuit 40 described below. When the on/off switch S1 and motion switch S2 are closed, capacitor C14 begins to charge through resistor R10. In turn, the transistor Q3 conducts allowing current to pass through resistor R11 to capacitor C15. While the capacitor C15 is charging, voltage builds at the base terminal of transistor Q4 causing it to conduct which allows current to pass from the resistor R12 to the emitter terminal of transistor Q4. The values of R11 and R12 are chosen to create a potential difference across a motion detector Y1 causing it to resonant at high frequency on the order of about 1 MHz. In response to external motion, e.g. by the user taking a step, a high frequency signal is emitted from the motion detector Y1 through capacitor C16 to an amplifier circuit formed by transistors Q5 and Q6. The amplifiers Q5 and Q6 function to increase the current flowing to an inductor L1 and capacitor C17, which, in turn, are induced to create a signal of approximately 2 MHz. The induced signal from the inductor L1 and capacitor C17 is then passed through a second inductor L2, and capacitors C19 and C20, before being transmitted to the antenna A1 where the signal is transmitted to the receiver circuit 40, described below. In a manner well known, the inductor L2 and capacitors C19, C20 are chosen to create a selected range of high frequency voltage for emission by the antenna A1.

When the switches S1 and S2 are opened, the capacitor C4 discharges through resistor R10, the base emitter of transistor Q3 and resistor R13. This causes the transistor Q3 to stop conducting, which, in turn, ends transmission of the high frequency signal.

Figure 4:
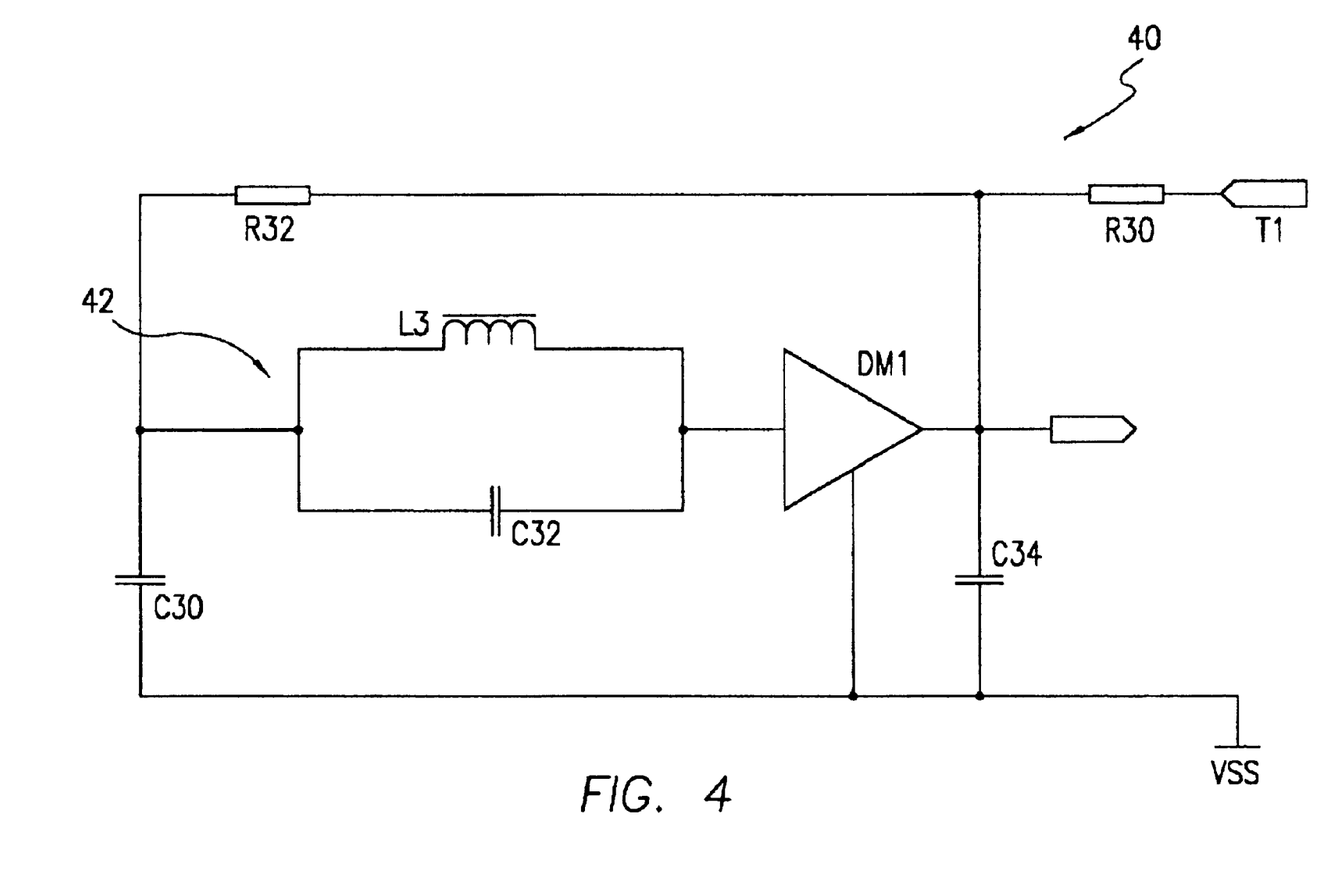
FIG. 4 is a schematic diagram of the circuit for the receiver unit 1.

Referring now to FIGS. 2 and 4, the terminal T1 is supplied with power from the output PA6 of the micro-controller 20. The current passes through R30 and R32 to capacitor C30, an LC circuit 42 formed by the inductor L3 and capacitor C32, an RF demodulator DM1 and a capacitor C34. When output PA6 is activated, capacitors C30 and C34 begin charging. In response to the receipt of a high frequency signal from the antenna A1 of the transmitter circuit 30 by the LC circuit 42, a high frequency voltage is induced corresponding to the values of the inductor L3 and capacitor C32. The high frequency voltage from the LC circuit 42 is demodulated by the RF demodulator DM1 which produces a suitable frequency trigger signal input to the capacitor C12 of FIG. 2 as described above.

Figure 1A:
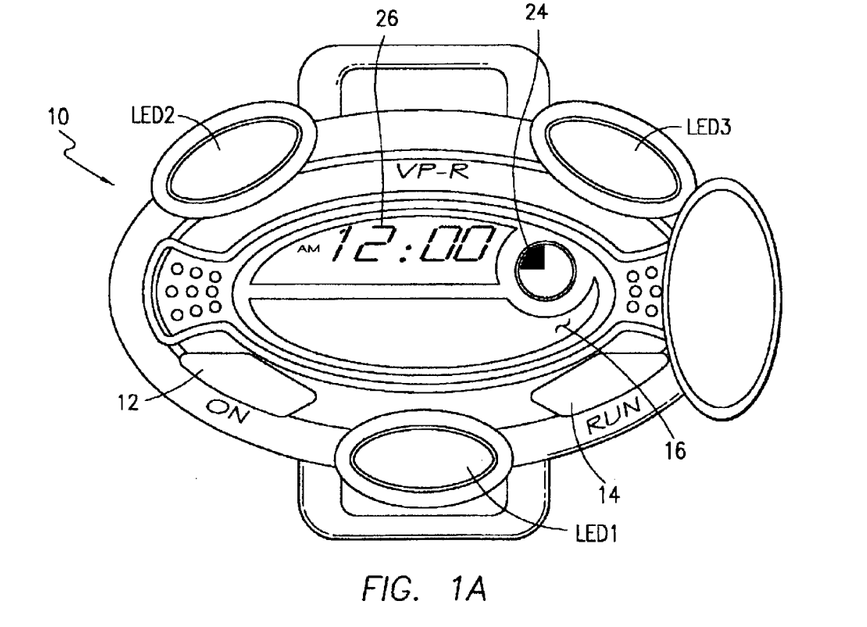
FIGS. 1A–1K are views similar to FIG. 1 depicting the various displays and messages provided by the console during use.
Figure 1B:
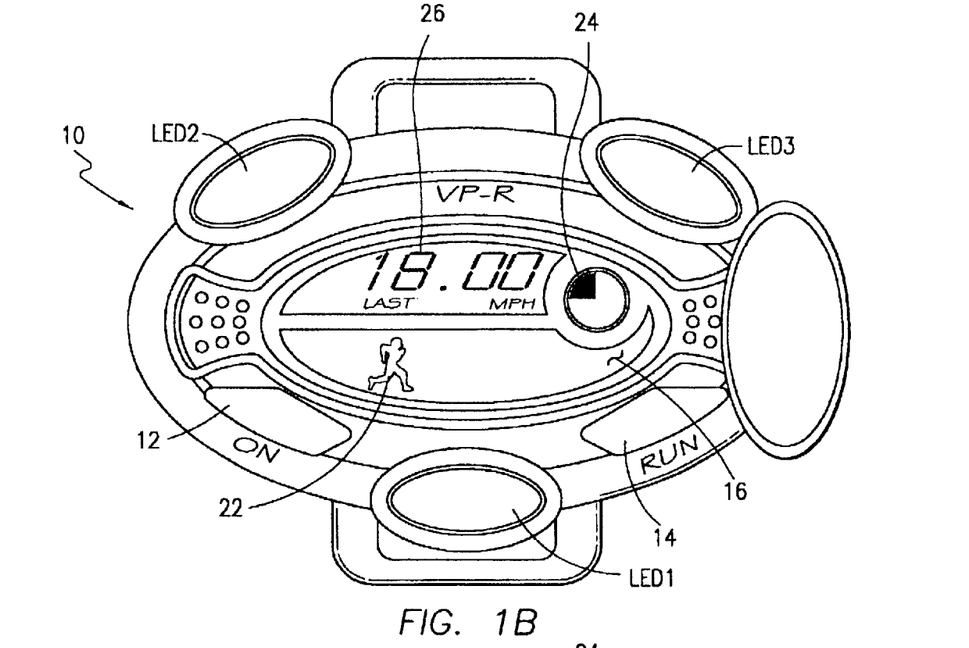
Figure 5:
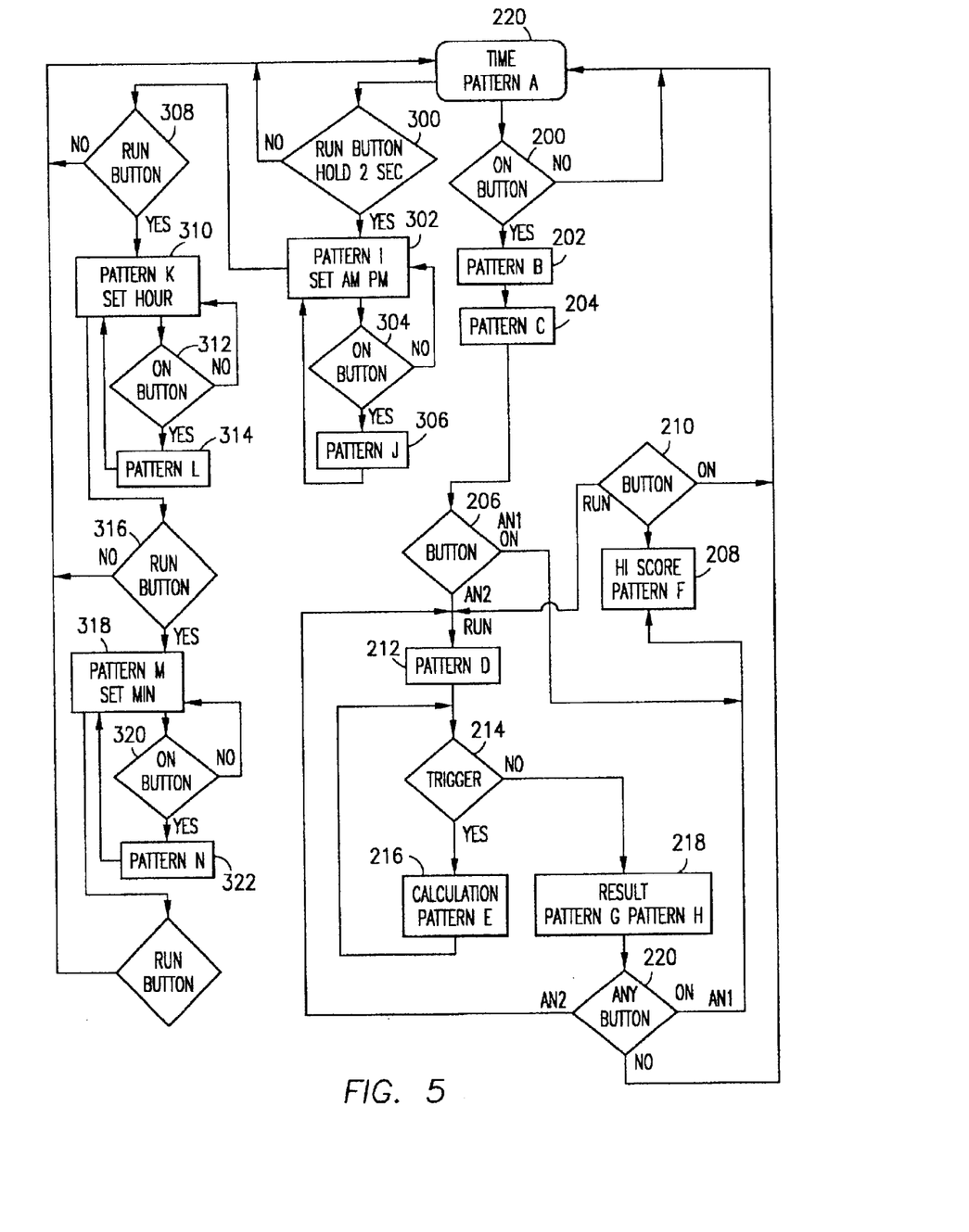
FIG. 5 is a block diagram flow chart depicting a preferred embodiment of the method of the present invention.

FIG. 5 is a flow chart illustrating a preferred embodiment of the method of the invention. The micro-controller 20 is in a powered down state until switch AN1 is closed, during which time the LCD 16 display the time and the quarter circle 24 moves around its display. See FIG. 1(a) and block 220. The micro-controller 20 is activated upon pressing the "on" button 12 of the console 10, as indicated in step 200. Upon activation of the micro-controller 20, a test is performed, which comprises momentarily flashing the LEDs, briefly lighting the figures and momentarily lighting the LCD segments to indicate that the micro-controller 20 is powered and ready for use, i.e., in an active mode. This test determines whether all the segments of the LCD 16 are functioning properly, as indicated in step at block 202. In the preferred embodiment, the LEDs are flashed, and the segments and figures are lit for approximately one second, such as shown in FIG. 1(*b*). This timing is controlled by the internal oscillator.

Figure 1C:
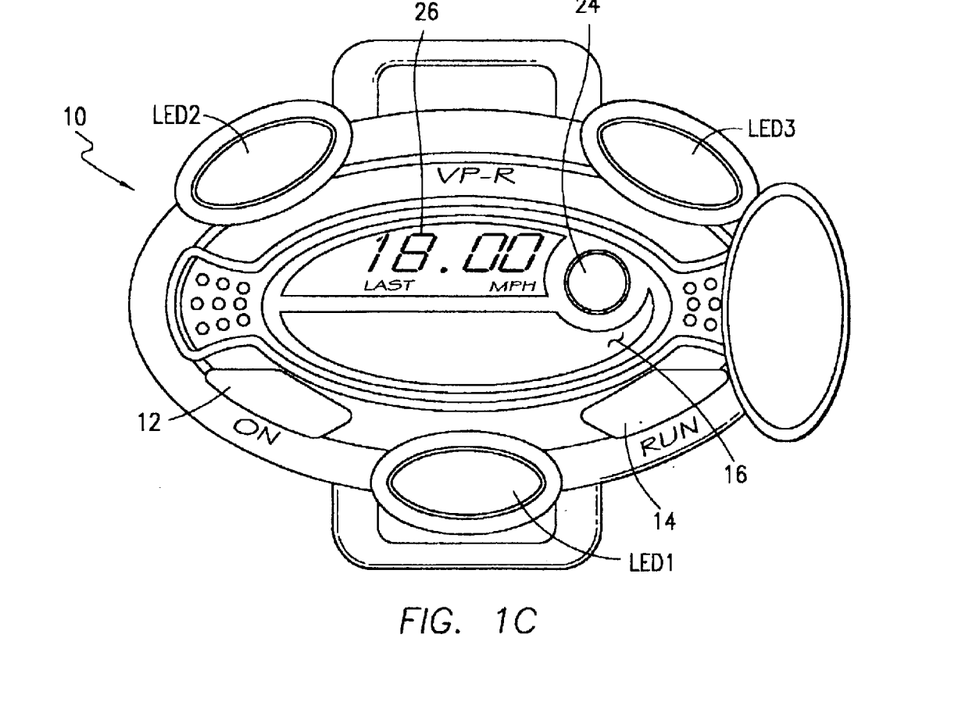

Next, the last recorded result is displayed on the LCD 16, such as shown in FIG. 1(*c*), and indicated at block 204. If the device is being used for the first time, the exemplary message shown in FIG. 1(*c*) is displayed on the LCD 16. Otherwise, the LCD will display the last recorded mileage.

Figure 1D:
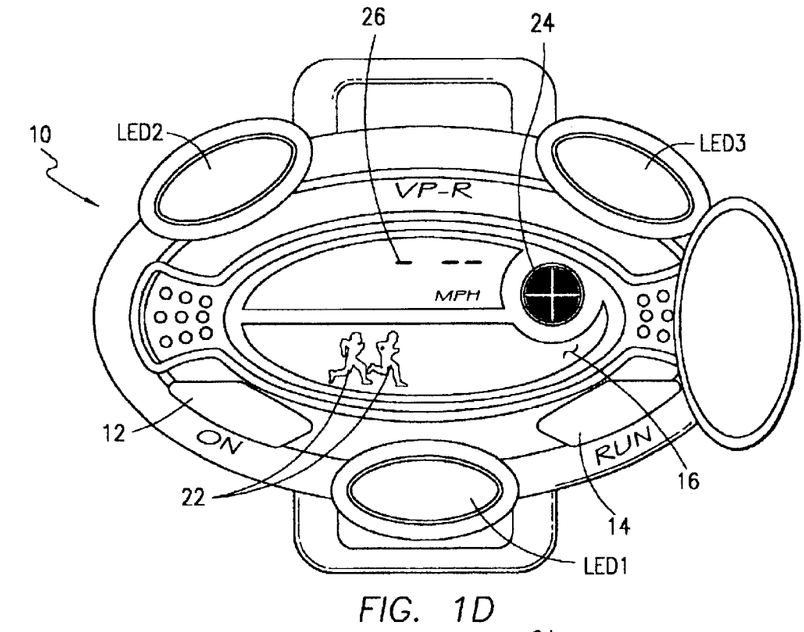
Figure 1E:
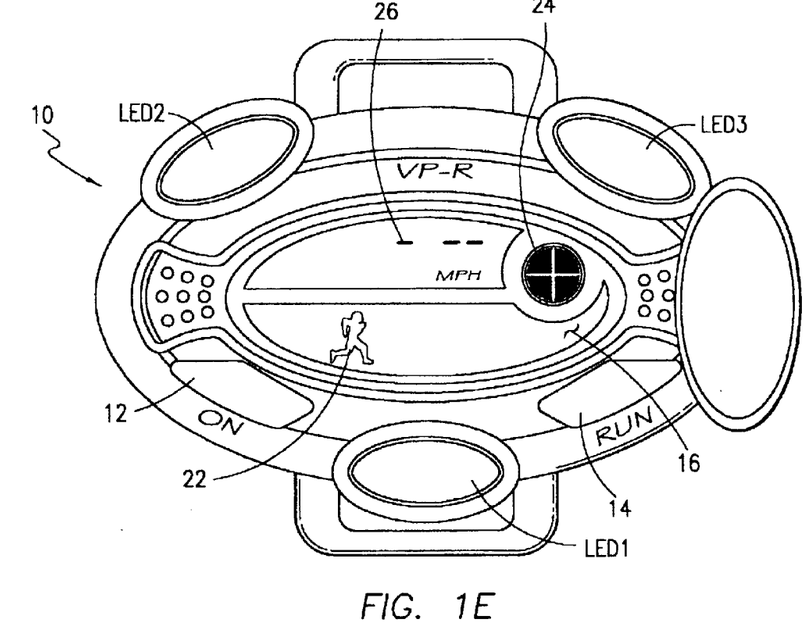
Figure 1F:
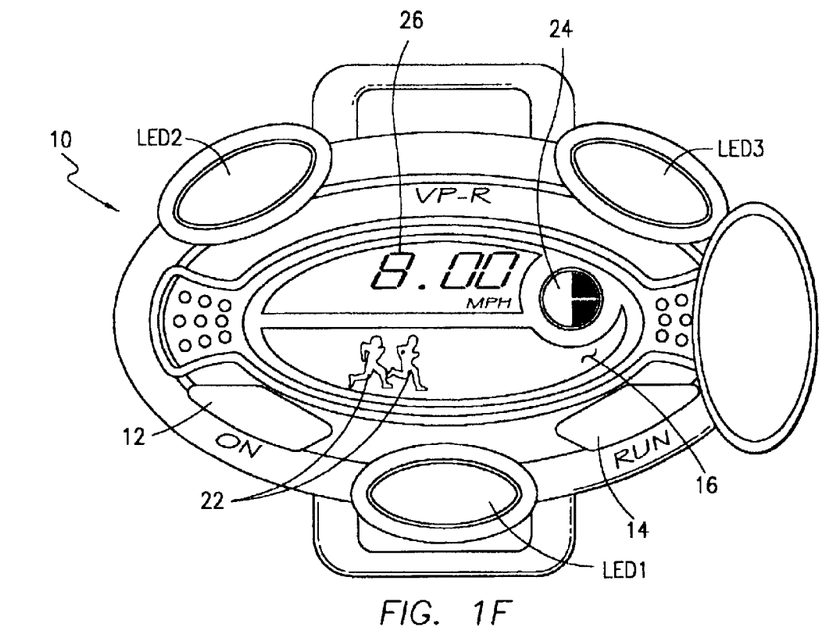

A check is performed to determine whether switch AN1 or AN2 was closed, as indicated at block 206. If the AN1 switch is closed, the last recorded highest speed is recalled and displayed as indicated at block 208. See FIG. 1(*f*). Here, repeated closures of the AN1 switch will cause the recall and display of the last recorded highest speed, as indicated in step at block 210.

If the AN2 switch is closed, the LEDs are lit in a prescribed sequence, or an audible sound is generated in a manner which is known, to indicate that the micro-controller 20 is ready to perform speed calculations, as indicated in step at block 212. In addition, a moving quarter circle flashes sequentially and figures are sequentially lit, such as indicated in FIG. 1(*d*). In the preferred embodiment, the prescribed sequence comprises first lighting LED1, then simultaneously lighting LED1 and LED2, and finally simultaneously lighting LED1, LED2 and LED3. The quarter circles are lighted in the same sequence as the LEDs, while the figures are lighted first two at a time, then four and finally all six together.

A check is performed to determine whether trigger signals associated with movement of the device are input to the micro-controller 20, as indicated at block 214. If the micro-controller 20 receives trigger signals, speed calculations are performed in response to the trigger signals and the LEDs flash in accordance with a predetermined sequence, as indicated at block 216. In the preferred embodiment, the predetermined sequence comprises first lighting LED1, lighting LED2, and then lighting LED3. In addition, the moving quarter circles sequentially flash and the figures are lit sequentially, such as shown in FIG. 1(*e*). With each step taken by the user, the motion sensor Y1 of the transmitter circuit 30 causes generation of the trigger signal which is amplified by transistors Q1 and Q2 (FIG. 2), and forwarded to the micro-controller 20 for calculation of the speed of the user in accordance with the relationship:

$$V = \frac{nd}{\sum_{i=0}^{n} t_i}, \quad \text{Equation (1)}$$

$$\text{Where}: T = \sum_{i=1}^{n} t_i, \; d \text{ (total running time)}$$

d=the distance between each step
n=the total number of steps in the total running time T and
ti=the time between steps taken by the user
The total distance can be broken up into a plurality of intervals which together make up the distance traveled. Then the speed in each interval can be calculated using equation (1). At the end of the exercise, the maximum of the speeds in the various intervals can be displayed.

Figure 1G:
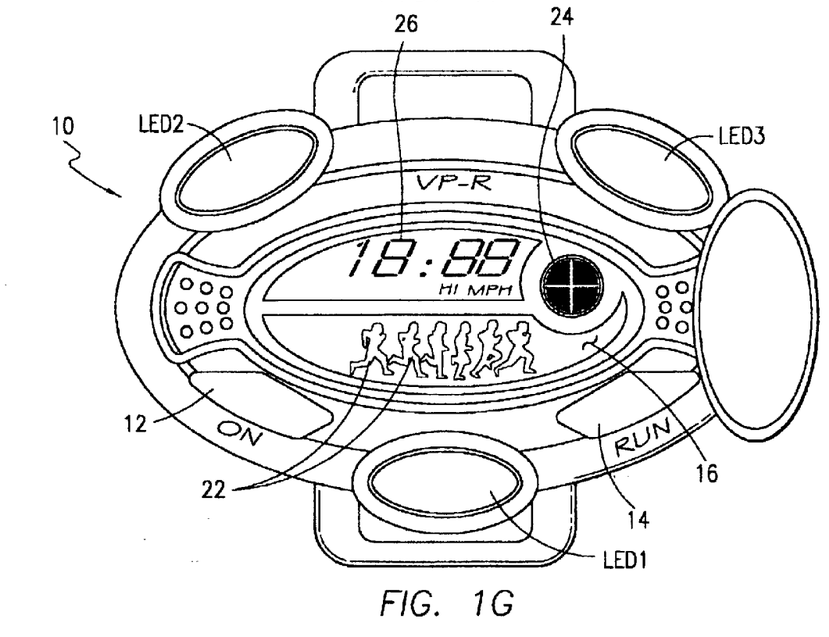

If the micro-controller 20 fails to receive a trigger signal for an extended period of time or fails to receive a trigger signal during an allotted time period, the calculation of the running speed is terminated, the LEDs are simultaneously flashed in phase at least once, the moving quarter circle moves to a corresponding position, the figures move to a corresponding position, and the speed achieved by the user is displayed on the LCD (FIG. 1(*g*)), as indicated at block 218. In the preferred embodiment, the extended period of time is approximately 1.75 seconds, the allotted time is approximately 20 seconds, and the LEDs are flashed approximately three times.

Figure 1H:
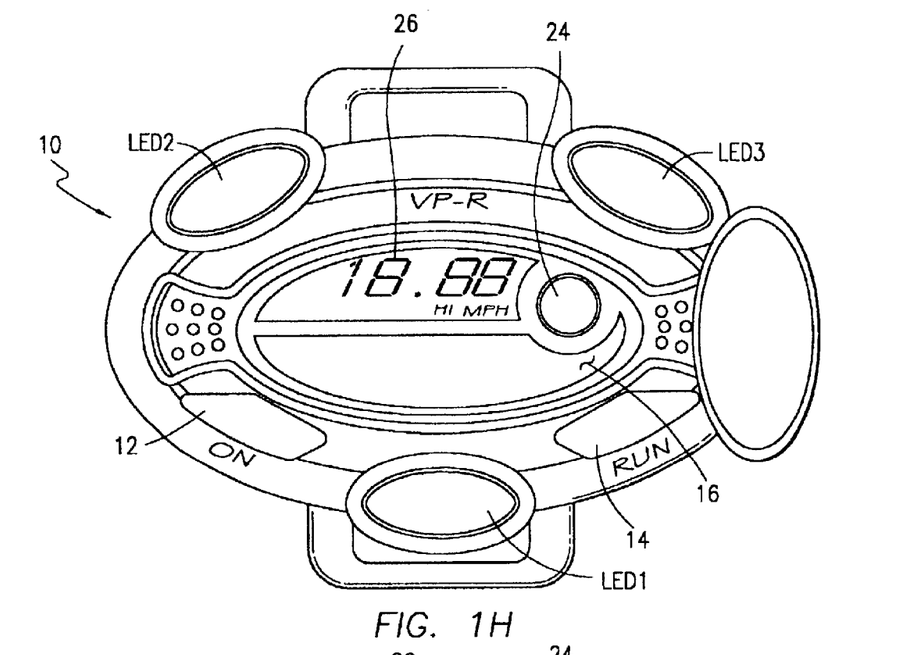

At this point, a check is also performed to determine whether the calculated speed is the highest recorded speed of the user. If the calculated speed is a new highest speed, a predetermined forward and backward flashing pattern is started, a congratulatory sound is generated, the moving quarter circle moves to a corresponding position, all the figures are lit and the speed is displayed on the LCD. See FIG. 1(*h*). In the preferred embodiment, the forward and backward flashing pattern comprises first lighting LED1, lighting LED2, and lighting LED3. Second, lighting LED3, lighting LED2, and lighting LED1. Third, lighting LED1, lighting LED2, and lighting LED3.

A check is performed to determine whether the AN1 switch or the AN2 switch has been closed, as indicated at block 220. If the AN1 switch was closed, then a return to block 208 occurs, and the LCD 16 displays the last recorded speed of the user. If the AN2 switch was closed, a return to block 212 occurs, and the LEDs are lit in accordance with the prescribed sequence or the audible sound is generated in a manner which is known to indicate that the micro-controller is ready to perform speed calculations. In addition, the moving quarter circle flashes sequentially and two figures are simultaneously lit. In the preferred embodiment, the prescribed sequence comprises first lighting LED1, then simultaneously lighting LED1 and LED2, and finally simultaneously lighting LED1 and LED3.

If the micro-controller 20 does not receive an input signal (i.e., the trigger signal or the closure of the AN1 or AN2 switches) for an extended period of time, such as ten seconds, it will power down and enter the standby or default mode in which the time is displayed on the LED as at block 220.

If the AN2 switch is closed for an extended period, such as for three seconds, the device 10 will power down, where LED1, LED2 and LED3 will simultaneously light up. In this state, all "records" in the micro-controller 20 are erased.

Figure 1I:
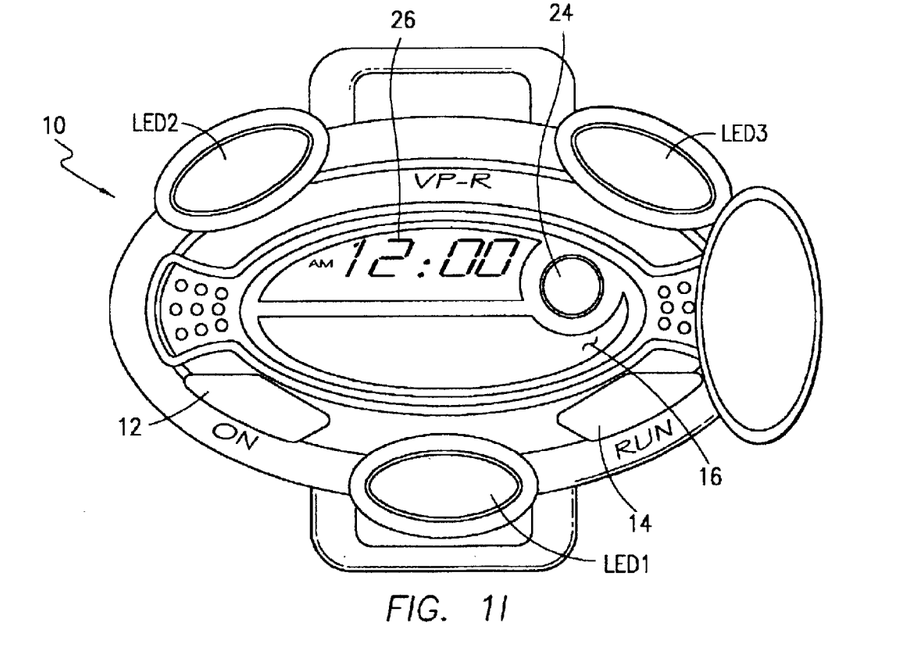

Referring now to the left hand portion of FIG. 5, the apparatus of this invention also functions as a watch with the capability to set the time and "AM" or "PM." As noted above, in the standby or default mode, the time is displayed on the console 10 of the apparatus. By depressing the "run" button 14 on the console for a period of about two seconds, as at block 300, the letters "AM" and "PM" appear on the LCD and flash on and off as represented by block 302. If the user desires to reset such indication, the "on" button 12 of the console is depressed as at block 304 until the appropriate designation "AM" or "PM" is obtained, as at block 306. See also FIG. 1(*I*)

Figure 1J:
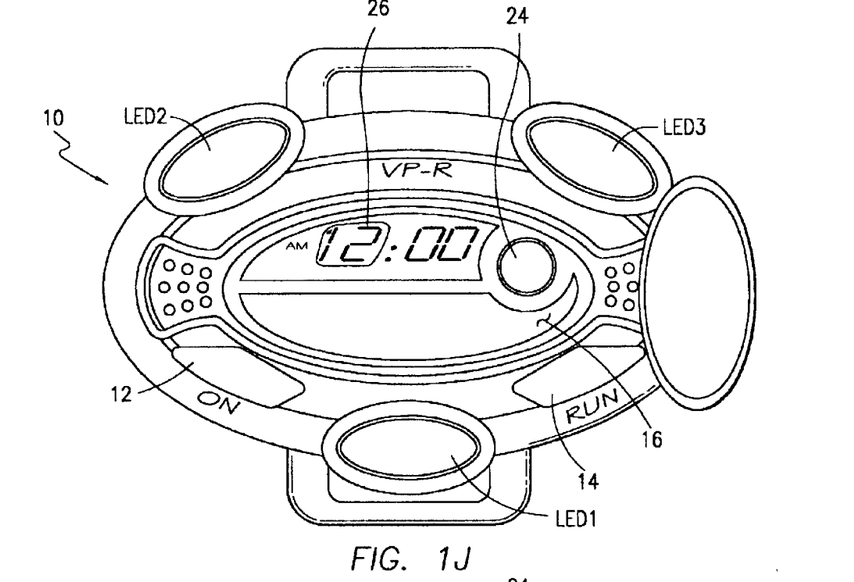
Figure 1K:
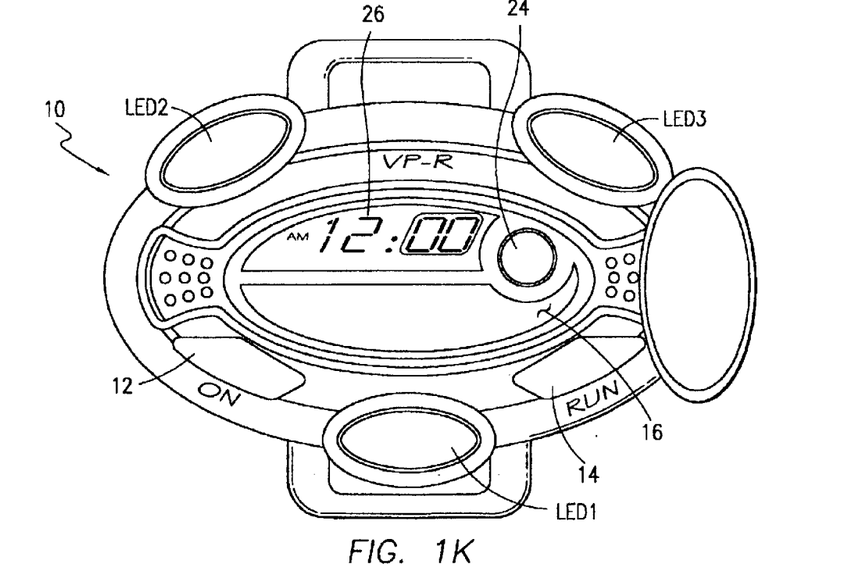

The hours and minutes displayed on the console are changed in the same manner. The run button is depressed for about two seconds at block 308 causing a flashing display of the hour at block 310. The hour indicia can be changed by the user by depressing the on button 12 at block 312 until the desired hour appears on the LCD as at block 314. See FIG. 1(J). In order the change the minute display, the run button is depressed at block 316, a flashing display of minutes appears as represented at block 318 and then the on button is used to obtain the desired minute display as shown at blocks 320 and 322. See also FIG. 1(K). Each time the run button is pressed, as at blocks 300, 308 and 316, if there is no desire to change the indicia appearing on the LCD then the on button is not activated and the apparatus will return to the default or stand by mode at block 220.

In an embodiment of the invention, other characteristics of the user, such as the length of a user's foot, the distance between each step, or the like, are added to the relationship shown in Eq. 1 such that highly accurate speed calculations are obtained. This information can be input when the microcontroller is in a proper mode by buttons 12, 14.

In additional embodiments of the invention, the motion detector Y1 may be a spring switch, a buzzer sensor, a metal ball sensor, or the like. In the preferred embodiment the motion sensor is a buzzer sensor.

In another embodiment of the invention, another result, such as a user's height, is obtained by adjusting the relationship between time (t), distance (d) and number of steps/motion (n) in Eq. 1. This is based on the assumption that the stride of the user is related to the user's height.

In a further embodiment of the invention, presentation features are provided, such as timing functions, and the like. In certain preferred embodiments, the time function is a watch, a stop watch, a count-down watch, or the like.

In another embodiment, the power on and power off functions are implemented by pressing AN1 and AN2 simultaneously.

The device provides a method for measuring the maximum speed of a runner over a prescribed distance. The device may be adapted for use on shoes, the wrist of a user, etc. and provides a means with which to motivate a user to run as fast as possible over the prescribed distance, and to ensure safety of the runner at night.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for determining the maximum speed of a user over a distance, comprising:
    a console adapted to mount to a body of the user, said console including a display and at least one light source;
    a transmitter unit having a motion sensor, said transmitter unit being operative to transmit an RF signal in response to the detection of motion by the user, and
    a circuit including a processor and a receiver unit, said receiver unit being operative to produce a trigger signal upon receipt of the RF signal from said transmitter unit, said processor being operative in response to said trigger signal to calculate and present the maximum speed of the user over a prescribed distance in accordance with the following relationship:

$$V = \frac{nd}{\sum_{i=0}^{n} t_i}$$

Where:
    n=the number of steps in the total running time T
    d=distance between steps
    $t_i$=time between steps $$T = \sum_{i=1}^{n} t_i, \; d \text{ (total running time)}$$

2. The apparatus of claim 1 in which said console includes a liquid crystal display which is operative to display the last recorded speed of the user, the highest speed during a use and the average miles per hour during a use.

3. The apparatus of claim 1 in which said console includes a liquid crystal display which is operative to display the time.

4. The apparatus of claim 3 in which said processor is operative to provide a display of AM and PM for the time and to permit changing from one display to the other.

5. The apparatus of claim 3 in which said processor is operative to permit setting of the known display of the time, including a minute display and an hour display.

6. The apparatus of claim 1 in which said motion sensor of said transmitter unit detects the stride of the user, and produces said trigger signal for each stride.

7. The method of determining the maximum speed of a user over a distance, comprising:
    (a) generating an RF trigger signal in response to the detection of motion of the user;
    (b) transmitting the RE trigger signal to a processor contained within a console carried by the user;
    (c) calculating the maximum speed of the user over a prescribed distance within said processor in accordance with the following relationship:

$$V = \frac{nd}{\sum_{i=0}^{n} t_i}$$

Where:
    n=the number of steps in the total running time T
    d=distance between steps
    $t_i$=time between steps $$T = \sum_{i=1}^{n} t_i, \; d \text{ (total running time)}$$

and
    d) displaying the maximum speed on a display of the console.

8. The method of claim 7 in which step (a) includes generating the RF trigger signal within a transmitter unit having a motion sensor.

9. The method of claim 8 in which step (a) includes sensing the stride of user with said motion sensor.

10. The method of claim 7 in which step (b) includes transmitting said RF trigger signal to a receiver unit within a circuit which includes said processor.

11. The method of claim 7 further including the step of displaying the time of the display on the console.

12. The method of claim 11 in which said step of displaying the time includes providing an AM and PM indication for the time, and permitting the user to set one or the other indication of the display.

13. The method of claim 11 which said step of displaying the time includes permitting the user to set the hour display of the time.

14. The method of claim 11 in which said step of displaying the time includes permitting the user to set the minute display of the time.

* * * * *